Jan. 5, 1943.    J. R. JOHNSON    2,307,222
MACHINE TOOL
Original Filed July 29, 1937    4 Sheets-Sheet 4
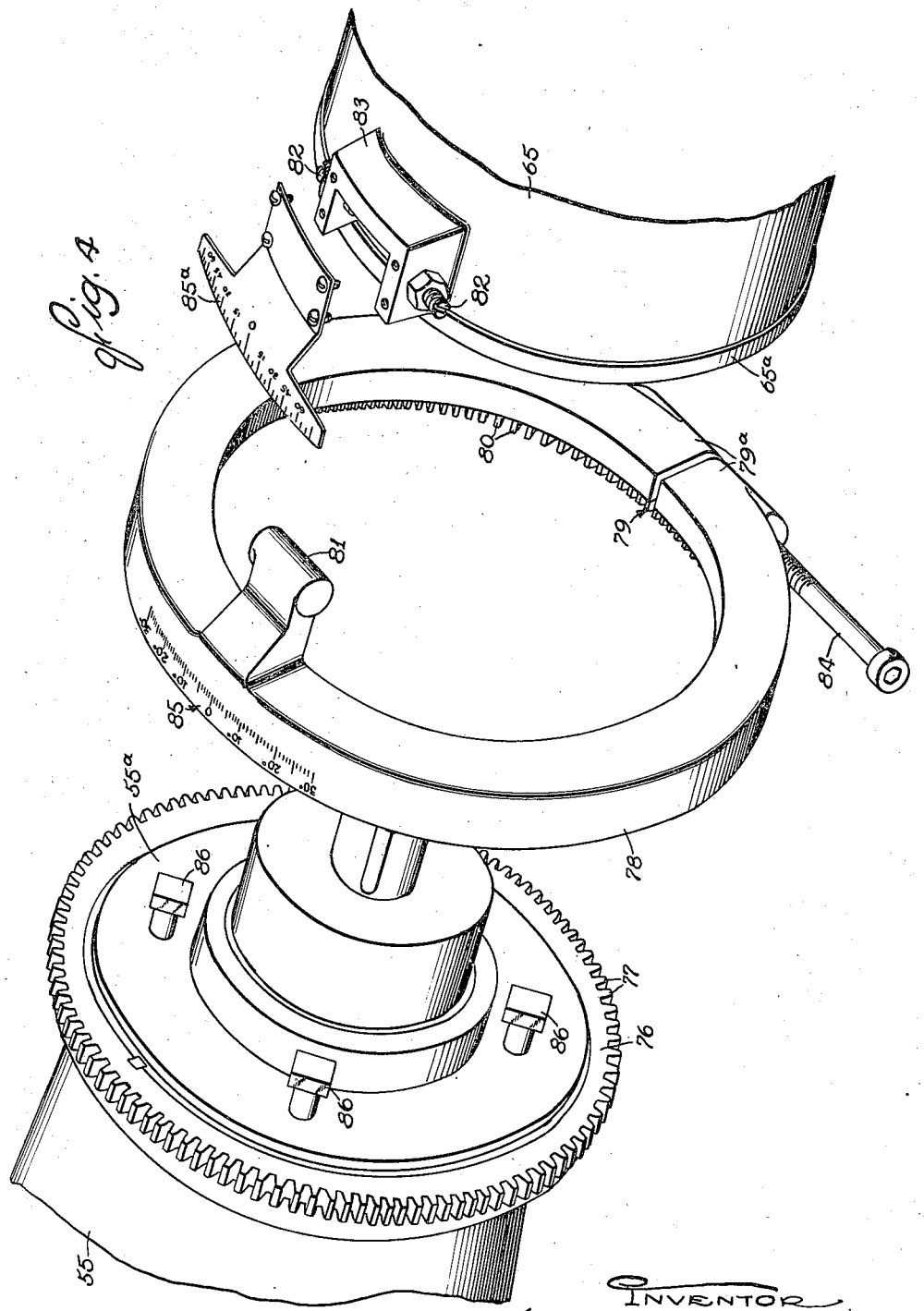

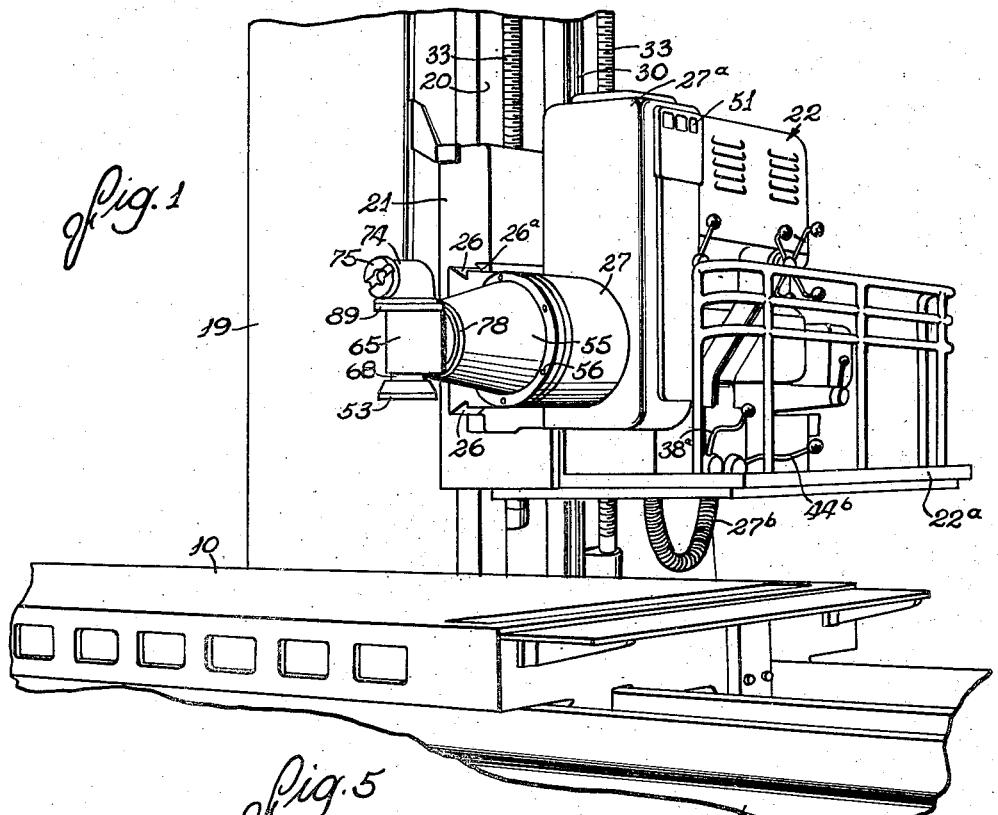
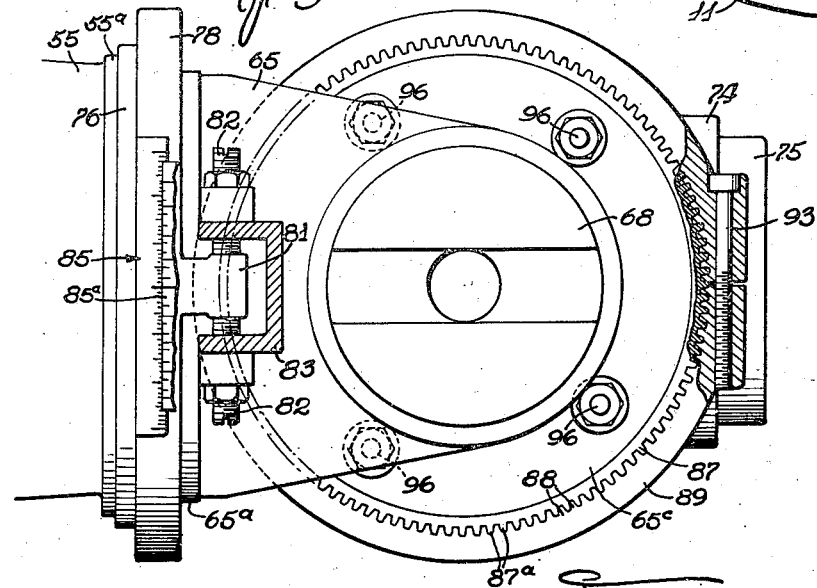

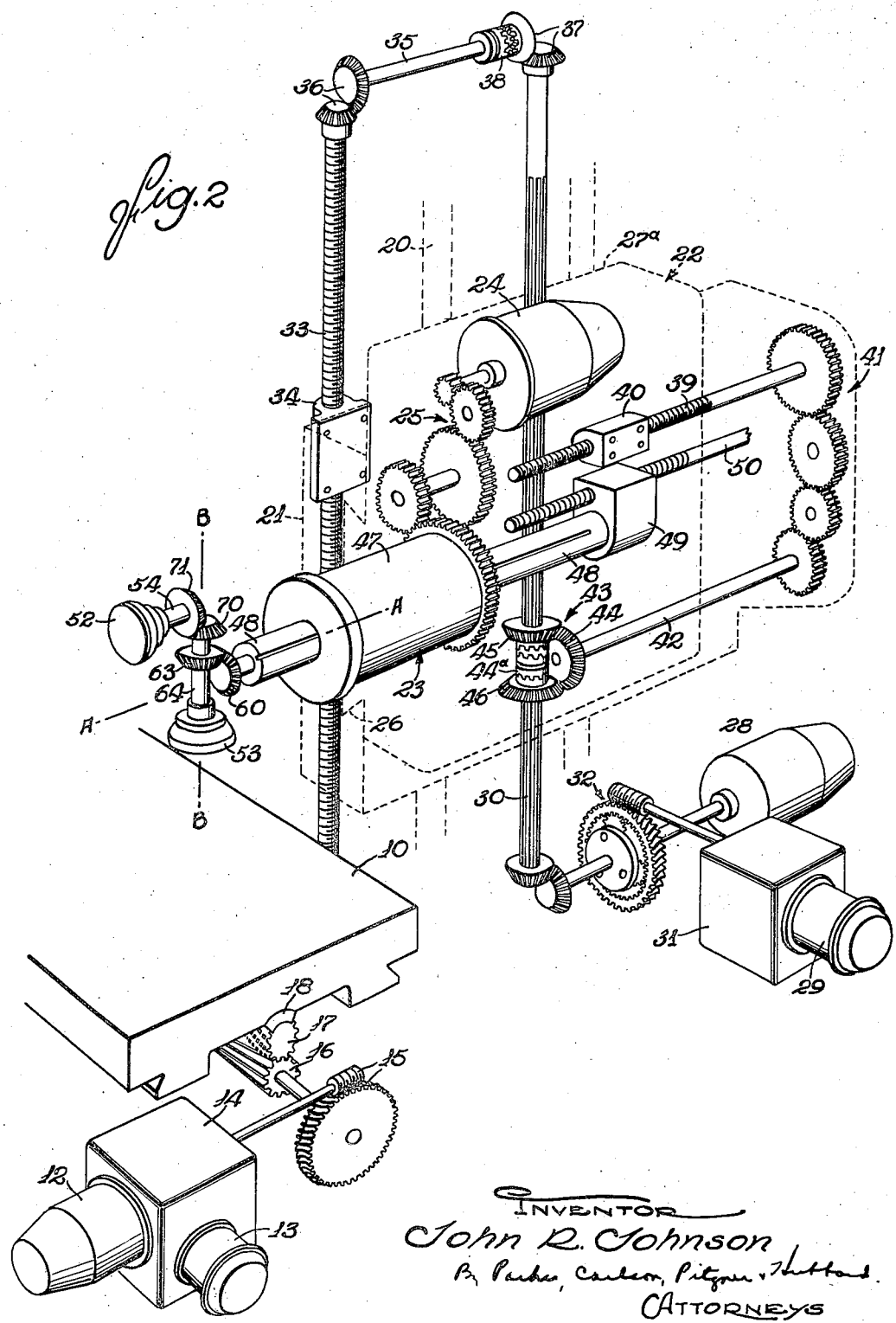

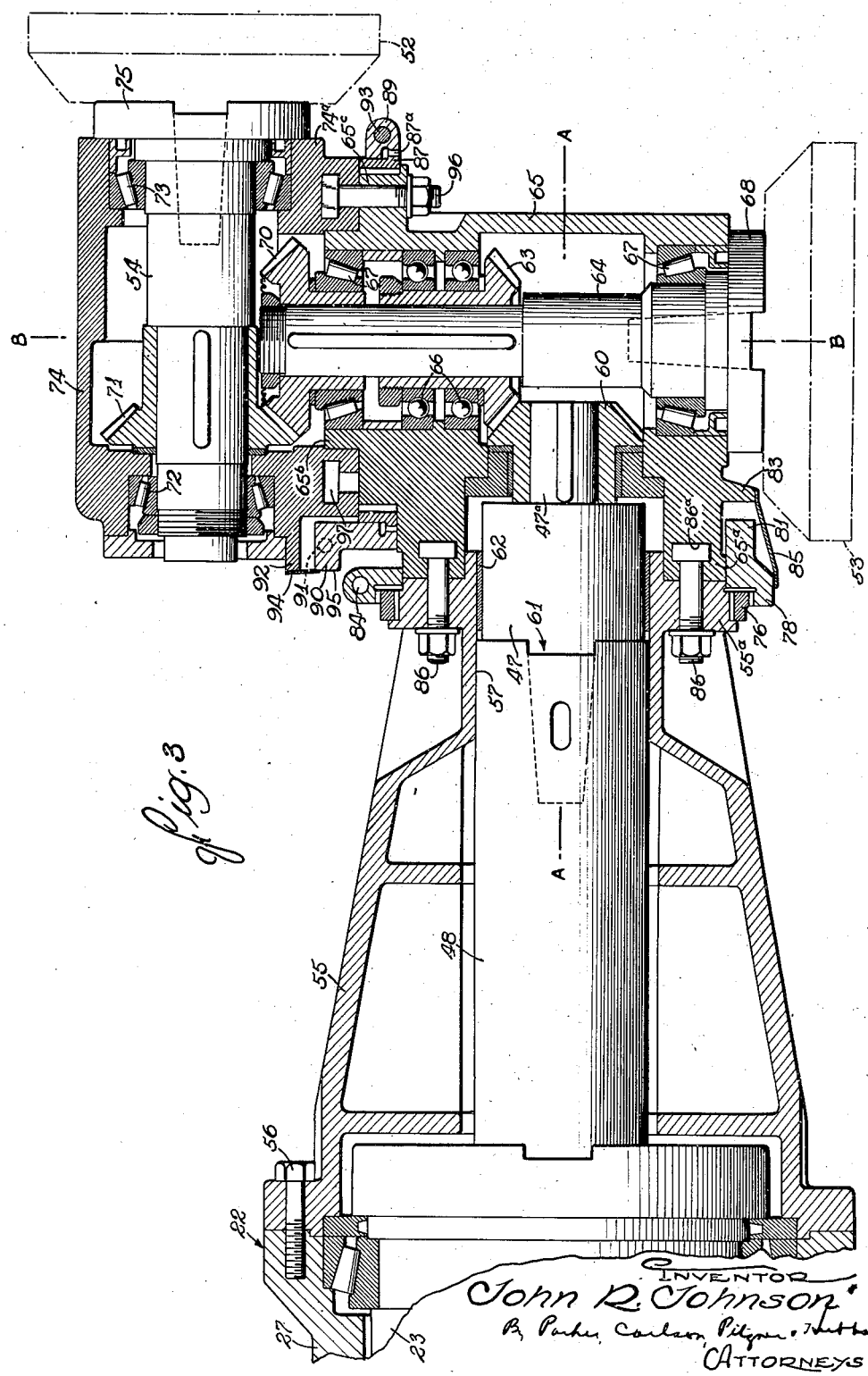

Patented Jan. 5, 1943

2,307,222

UNITED STATES PATENT OFFICE 2,307,222

MACHINE TOOL

John R. Johnson, Rockford, Ill., assignor to The Ingersoll Milling Machine Company, Rockford, Ill., a corporation of Illinois Original application July 29, 1937, Serial No. 156,287. Divided and this application May 29, 1940, Serial No. 337,935

9 Claims. (Cl. 90—17)

The invention relates to machine tools and more particularly to improvements in milling or boring machines having a cutter mounted for universal adjustment to adapt it for machining.

One object of the present invention is to provide a machine tool of the type set forth which is capable of extreme flexibility of adjustment of the cutter position so as to accommodate the machining of both inner and outer surfaces of work pieces even though such surfaces be located in a great variety of angular positions, all without sacrifice in the precision of the work performed or in the power available for the metal removing operations.

A further object of the invention is to provide a machine of the type set forth embodying a novel cutter spindle support by means of which the spindle may be bodily shifted about a plurality of axes to facilitate positioning of the cutter for machining variously disposed portions of a work piece.

The invention also resides in a novel adjusting and locking mechanism for the cutter spindle.

Other objects and advantages of the invention will become apparent from the following detailed description taken in connection with the accompanying drawings, in which Figure 1 is a perspective view of a machine tool embodying the invention, portions of the bed and work supporting table being broken away.

Fig. 2 is a diagrammatic illustration of the driving mechanism for the various elements of the machine tool shown in Fig. 1.

Fig. 3 is a fragmentary longitudinal sectional view through the cutter head.

Fig. 4 is an exploded perspective view of the parts of adjusting and locking mechanism for a portion of the cutter head.

Fig. 5 is an end elevation partly in section of the outer portion of the cutter attachment head shown in Fig. 3 and illustrating particularly the adjustment mechanism therefor.

The invention has been shown herein for purposes of illustration as embodied in a so-called open-side milling or boring machine comprising a work support in the form of a table 10 mounted for horizontal sliding movement on a bed 11. The table may be advanced at either a rapid traverse rate or at a relatively slower feed rate by any suitable power actuated mechanism. Herein, this is accomplished by a rapid traverse motor 12 (Fig. 2) and a feed motor 13 operatively connected to the table 10 through a differential gear mechanism 14, connected through a worm gear and worm 15, to an elongated pinion 16 meshing with a split tooth worm 17, which in turn meshes with a rack 18 fast on the table 10.

The tool supporting mechanism embodies a vertical column 19 (Fig. 1) which is preferably fixedly mounted on the floor at one side of the table 10 and provided with vertical ways 20 on a lateral face thereof. A saddle 21 is arranged to slide vertically in the ways 20. The saddle in turn carries a tool head assembly designated generally by the numeral 22 and mounted for bodily endwise movement in a horizontal direction relative to the saddle and transversely of the table 10.

The tool head assembly 22 includes a rotatable tool driving spindle in the form of a sleeve 23 (Fig. 2) driven by an electric motor 24 connected to the spindle 23 through gearing 25. The spindle sleeve is journaled and held against endwise movement in a tubular extension 27 projecting from a box-like casing 27ª in which the motor 24 and drive gearing are housed. Along the rear side, the casing and the extension are formed with vertically spaced dovetail surfaces 26 mating with spaced parallel ways 26ª formed in the front face of the saddle 21 and extending horizontally. The spindle sleeve is thus supported horizontally for axial movement so that the tool carried by the spindle may, by sliding the tool head along the ways 26ª, be disposed in different positions transversely of the table 10. Power is supplied to the motor 24 through conductors within a flexible cable 27ᵇ (Fig. 1).

By slidably mounting the tool head 22 on the saddle 21 in the manner described above, adjustment of the tool transversely of the table may be effected without shifting the table or the column as has been the practice heretofore. As a result the spindle is supported with greater rigidity throughout its wide range of axial adjustment. In addition, by locating the ways 26 on the rear side of the tool head, long and rugged guideways may be employed while at the same time permitting the driving parts to be arranged compactly on the head in front of the guideways.

A single power actuating mechanism is preferably utilized for advancing the saddle 21 along the vertical ways 20 as well as for sliding the tool head assembly 22 transversely with respect to the saddle. As shown in Fig. 2, this mechanism has been illustrated in the form of a rapid traverse motor 28 and a feed motor 29 connected to a vertical spline shaft 30 on the column 19 through a speed change gearing 31 and a differential gear mechanism 32. The spline shaft 30 is connected to the saddle 21, for effecting translatory movement thereof, through a pair of lead screws 33 having traveling nuts 34 thereon fast on the saddle and connected to the spline shaft 30 through an intermediate shaft 35 and miter gears 36 and 37. A clutch 38 interposed between the miter gears 37 and the intermediate shaft 35 is arranged to be operated at will by a hand lever 38ª to connect the spline shaft 30 to or disconnect the same from the lead screw 33.

Similarly, translatory motion is imparted to the tool head assembly 22 from the rotatable spline shaft 30 through the medium of a lead screw 39 journaled in the casing 27ª and threaded in a traveling nut 40 fast on the casing. The screw 39 is driven through gearing 41 and a shaft 42 connected to the spline shaft 30 through a clutch mechanism 43. The latter includes a bevel gear 44 fast on the shaft 42 and meshing with a pair of bevel gears 45 and 46 which are loose on the shaft 30 and adapted to be engaged selectively by an axially shiftable collar 44ª splined on the shaft. The collar 44ª may be shifted by a hand lever 44.

For some operations, particularly boring, it may be desirable to position a cutting tool at a point beyond the range of horizontal traversing movement of the tool head assembly 22. To provide for this, a shaft or boring bar 48 is extended through and splined within the spindle sleeve 23. The cutter supporting end of this bar may be projected outwardly from the sleeve 23 by a suitable traversing mechanism shown in the form of a traveling nut 49 fast on the other end of the bar and threaded on a screw 50. The latter may be driven from the spline shaft 30 through a suitable gearing mechanism and a clutch (not shown).

A central control station for all of the power actuating mechanisms is preferably provided on the tool head assembly 22. This may, for example, take the form of a switchboard 51 (Fig. 1) and the various clutch control levers which are disposed within the convenient reach of an operator standing on a platform 22ª also supported by the tool head.

In the use of an open side milling machine of the character described above, a milling cutter may be mounted directly on the end of the spindle 23 or, the cutter shank may be inserted in the recessed end of the bar 48. In the latter location, the cutter may also be used for boring operations. An important aim of the present invention is to increase substantially the versatility of an open side milling machine and provide in combination therewith a novel attachment for supporting face milling cutters 52 and 53 (Figs. 2 and 3) in a manner such as to permit the milling of work surfaces disposed in widely varying angular positions exteriorly or interiorly of a work piece on the table 10. For this purpose, the cutter 52 is disposed with its axis disposed parallel to and spaced from the axis A—A of the spindle 23 and is mounted for adjustment bodily around the axis A—A and also around an axis B—B extending transversely of and intersecting the axis A—A and the cutter axis.

To thus support the cutter 52, a reinforced tubular casing 55 preferably of conical shape is clamped securely, as by cap screws 56, against the flanged outer end of the extension 27 in which the spindle 23 is journaled. Near its outer end, the casing 55 supports a bearing 62 for the plug 57 which is received in the recessed end of the boring bar 48 and is coupled thereto by a tongue and groove connection 61. The reduced end 47ª of the plug has fast thereon a bevel gear 60 from which the rotary motion of the spindle 23 is transmitted to the cutters 52 and 53.

Mounted on the outer end of the casing 55 for adjustment about the axis A—A is a housing 65 having a tubular extension 65ª received on the reduced end of the casing 55 in abutment with a flange 55ª. This relation is maintained and rotary adjustment of the housing permitted by T-bolts 86 extending through and anchored in the flange 55ª with their heads seated in annular T-slots 86ª in the face of the extension 65ª. A second tubular extension 65ᵇ of the housing 65 concentric with the axis B—B provides a bearing for a second housing 74 having a flange 74ª formed with an annular axially facing T-slot 97 and held in abutment with a flange 65ᶜ by bolts 96. The latter are anchored in the flange 65ᶜ and have their heads seated in the slot 97. The housing 74 is thus mounted to swivel about the axis B—B.

The cutter 52 is attached in a well known manner to the projecting end 75 of a spindle 54 journaled at opposite ends in bearings 72 and 73 supported by the housing 74. Within the housing, the spindle has fast thereon a bevel gear 71 which meshes with a gear 70 on the end of a shaft 64 extending through the housing 65 along the axis B—B and journaled in bearings 67 supported by the housing. Fast on the shaft 64 and journaled in the bearings 66 is a bevel gear 63 which meshes with the drive gear 60. The end 68 of the shaft 64 remote from the shaft 54 projects from the housing 65 and is adapted to receive the shank of the milling cutter 53.

From the foregoing, it will be seen that the driving connections are such as to permit swiveling of the housing 65 about the axis A—A to move both the spindle shafts 64 and 54 about this axis. In addition, the housing 74 may be swiveled about the axis B—B to effect a further adjustment of the spindle 54. In other words the spindle 54 may be shifted bodily about either or both of the axes A—A and B—B. The axis of the auxiliary spindle 54 is offset laterally a sufficient distance from the axis of the shaft 58 (Fig. 3) that adjustment of the cutter on the spindle 54 may be had through a full 360 degrees without interference by the housing 55.

In view of the heavy loads to which the cutters may be subjected, novel adjusting and locking mechanisms have been provided to insure rigid connection of the housings 55, 65, and 74 after adjustment of the cutter. These mechanisms are similar in construction and that for the housing 65 comprises a pair of concentric rings 76 and 78 fast respectively on the housing 65 and its supports 55ª and having mating teeth on their adjacent surfaces which may be moved into engagement to lock the members positively against relative rotation. As shown in Fig. 4, the ring 76 has teeth 77 on its outer periphery and is keyed to the guide flange 55ª on the housing 55. The ring 78 is split radially as indicated at 79 and has teeth 80 on its inner surface encircling the ring 76. Relative rotation between the split ring 78 and the housing 74 is prevented by the engagement of a lug 81 on the split ring, with a pair of abutments in the form of screws 82 threaded in the opposite side walls of a yoke 83 integral with the housing 65. Threading through lugs 79ª (Fig. 4) on the split portions of the ring 78 is a screw 84 which may be turned to expand or contract the ring. When the ring 78 is contracted about the ring 76 with the teeth 77 and 80 engaged, the housing 65 will be locked firmly to the casing 55. By loosening the screw 84 to relieve the clamping pressure, the ring 78 may be shifted axially to disengage the teeth 80 from the teeth 77 after which the housing 65 may be turned as desired. After adjustment, the rings are re-engaged and locked together by tightening the screw 84.

The numbers of teeth on the rings 76 and 78 are so chosen that an advance of one tooth therebetween will effect an angular adjustment of the housing 65 of fixed amount. In the preferred construction illustrated, 120 teeth are provided on the ring 76 so that the housing 65 may be adjusted about the axis A—A in increments of three degrees each. Finer adjustment may be effected by shifting the screws 82 to move the lug 81 and its attached split ring 78 with respect to the housing 65. The amount of this latter adjustment is determined by cooperating marks 85 on the periphery of the split ring 78 and a scale 85ª (Figs. 4 and 5) which overlies the same. An accurate vernier adjustment is thus provided. After the housing has been adjusted in the manner described above, the bolts 86 may be tightened to effect final rigid locking of the housing 65 to the casing 55.

Upon reference to Figs. 3 and 5, it will be seen that the housing 74 is adjustably locked in position on the casing 65 by a similar mechanism including a ring 87 keyed to the guide flange 65ᵇ on the outer end of the casing 65 and having teeth 87ª meshing with complemental teeth 88 on a resilient split ring 89 encircling the same. The split ring is adjustably made fast to the housing 74 by a lug 90 interposed between adjusting screws 91 (Fig. 3) threaded in the opposite side walls of a yoke 92 which is integral with the housing 74. As in the case of the mechanism previously described, the split ring 89 is releasably clamped on the fixed toothed ring 87 by a screw 93 which serves to draw the ends of the split ring together. The teeth 87ª on the fixed ring 87 are also preferably 120 in number so that an advance of one tooth effects an angular adjustment of three degrees while adjustments of a lesser angularity are had by changing the position of the lug 90 with respect to the casing 65 through the medium of screws 91. A scale plate 94 (Fig. 5) secured to the yoke 92 overlies a complemental scale 95 on the split ring 89 to indicate the degree of angular adjustment effected by the screws 91. Rigid connection of the housings 65 and 74 after the latter have been located in the desired angular position is effected by tightening the bolts 96.

The machine tool above described is extremely versatile in its operation and is adapted to face mill surfaces disposed at widely varying angles not only on the exterior of a work piece but is particularly adapted to machine surfaces on the interior of relatively large work pieces such, for example, as large dies or the supporting boxes therefor. Thus, the face of the cutter 52 may, by bodily adjustment of the cutter about the axes A—A and B—B, be disposed at any desired plane. Then, by reciprocating the work table 10, by moving the saddle 21 vertically, or by sliding the tool head 22 horizontally, a surface extending in any one of three transverse directions may be milled.

This application is a division of my copending application Serial No. 156,287, filed July 29, 1937, and issued December 31, 1940, as Patent No. 2,227,410.

I claim as my invention:

1. In a machine tool, a tool head having, in combination, a pair of angularly disposed and operatively connected shafts, one being power driven and the other being connected to a rotary metal removing tool, two members rotatably supporting the respective shafts and connected for angular adjustment relative to each other about the axis of one of the shafts, means releasably locking said members in selected positions of adjustment about said axis comprising complemental annular rows of mating projections mounted on the respective members for movement into and out of mating relation, one of said rows being fast on one of said members, and means for fastening the other row of projections to the other of said members for angular adjustment about said axis through a selected distance less than the increments defined by the spacing of said projections.

2. In a machine tool, a tool head having, in combination, a pair of angularly disposed and operatively connected shafts, one being power driven and the other being connected to a rotary metal removing tool, two members rotatably supporting the respective shafts and connected for angular adjustment relative to each other about the axis of one of the shafts, means releasably locking said members in selected positions of angular adjustment about said axis and including cooperating abutments constituting stops defining successive positions of step-by-step angular adjustment between said members, and means for effecting relative angular adjustment between said members through any distance less than one of said steps.

3. In a machine tool, a tool head having, in combination, a pair of angularly disposed and operatively connected shafts, one being power driven and the other being connected to a rotary metal removing tool, two members rotatably supporting the respective shafts and connected for angular adjustment relative to each other about the axis of one of the shafts, and means releasably locking said members in selected positions of angular adjustment about said axis comprising an annulus of peripheral radially disposed teeth on one of said members and a resilient radially split ring fast on the other of said members and having internal teeth thereon engageable with said first-named teeth upon tightening of said split ring about the same.

4. In a machine tool, a tool head having, in combination, a pair of angularly disposed and operatively connected shafts, one being power driven and the other being connected to a rotary metal removing tool, two members rotatably supporting the respective shafts and connected for angular adjustment relative to each other about the axis of one of the shafts, two elements mounted on the respective members and interengageable to lock the members releasably against angular movement, said elements being disengageable to permit of angular adjustment between the members in predetermined increments, and means connecting one of said elements to its supporting member for adjustment relative thereto in measured fractions of said increments.

5. In a machine tool, a tool head having, in combination, a pair of angularly disposed and operatively connected shafts, one being power driven and the other being connected to a rotary metal removing tool, two members rotatably supporting the respective shafts and connected for angular adjustment relative to each other about the axis of one of the shafts, two rows of teeth on the respective members and interengageable in different angular positions of said members to lock the members together and provide for relative angular adjustment of the two in predetermined increments, and means connecting one of said rows of teeth to its associated member for adjustment relative thereto in fractions of said increments.

6. In a machine tool, a tool head having, in combination, a pair of angularly disposed and operatively connected shafts, one being power driven and the other being connected to a rotary metal removing tool, two members rotatably supporting the respective shafts and connected for angular adjustment relative to each other about the axis of one of the shafts, interengaging means positively locking said members against relative rotation but disengageable to permit of relative step-by-step angular adjustment of the members, and means associated with said last mentioned means and providing for angular adjustment of said members in variable fractions of said increments.

7. In a machine tool, a tool head having, in combination, a pair of angularly disposed and operatively connected shafts, one being power driven and the other being connected to a rotary metal removing tool, first and second members rotatably supporting the respective shafts and connected for angular adjustment relative to each other about the axis of one of the shafts, a series of teeth rigid with said first member and concentric with said axis, a toothed element loose on said second member and having teeth adapted to mesh with said first teeth in different angular relations of said members, and connecting means between said second member and said element to hold the latter adjustably against relative angular displacement, said connecting means including a screw adapted to be turned to effect varying degrees of progressive angular adjustment between said element and said second member.

8. In a machine tool, a tool head having, in combination, a pair of angularly disposed and operatively connected shafts, one being power driven and the other being connected to a rotary metal removing tool, two members rotatably supporting the respective shafts and connected for angular adjustment relative to each other about the axis of one of the shafts, interengaging means positively locking said members against relative rotation but disengageable to permit of relative step-by-step angular adjustment of the members, and means connecting said interengaging means and one of said members for progressive relative angular adjustment about said axis including a screw element rotatable to effect such adjustment.

9. In a machine tool, a tool head having, in combination, a pair of angularly disposed and operatively connected shafts, one being power driven and the other being connected to a rotary metal removing tool, two members rotatably supporting the respective shafts and connected for angular adjustment relative to each other about the axis of one of the shafts, interengaging means positively locking said members against relative rotation but disengageable to permit of relative step-by-step angular adjustment of the members, and means connecting said interengaging means and one of said members for progressive relative angular adjustment about said axis including an element rotatable to effect such progressive adjustment.

JOHN R. JOHNSON.